(12) United States Patent
Fu et al.

(10) Patent No.: US 11,005,671 B2
(45) Date of Patent: May 11, 2021

(54) PORT ADAPTATION METHOD AND APPARATUS

(71) Applicant: Huawei Technologies Co., Ltd., Shenzhen (CN)

(72) Inventors: Shiyong Fu, Nanjing (CN); Yan Zhuang, Nanjing (CN); Rui Hua, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 62 days.

(21) Appl. No.: 16/114,896

(22) Filed: Aug. 28, 2018

(65) Prior Publication Data

US 2019/0068386 A1 Feb. 28, 2019

(30) Foreign Application Priority Data

Aug. 28, 2017 (CN) .......................... 201710749681.5

(51) Int. Cl.
*H04L 12/10* (2006.01)
*H04L 12/40* (2006.01)
(Continued)

(52) U.S. Cl.
CPC .............. *H04L 12/10* (2013.01); *G06F 1/263* (2013.01); *G06F 1/266* (2013.01);
(Continued)

(58) Field of Classification Search
CPC .......................... G06F 1/263; H02J 13/0062; H04L 12/40045; H04L 43/12; H04L 12/10
See application file for complete search history.

(56) References Cited

U.S. PATENT DOCUMENTS

| 7,664,136 B2 | 2/2010 | Toebes et al. |
| 7,836,336 B2 | 11/2010 | Biederman et al. |

(Continued)

FOREIGN PATENT DOCUMENTS

| CN | 105515787 A | 4/2016 |
| CN | 106101028 A | 11/2016 |

(Continued)

OTHER PUBLICATIONS

Machine Translation and Abstract of Japanese Publication No. JP2009260407, Nov. 5, 2009, 14 pages.

(Continued)

*Primary Examiner* — Mohammed H Rehman
*Assistant Examiner* — Gayathri Sampath
(74) *Attorney, Agent, or Firm* — Conley Rose, P.C.

(57) ABSTRACT

A network device probes whether a first port of the network device is coupled to power sourcing equipment, and when probing that the first port is coupled to power sourcing equipment, maintain or change the first port to a powered state, and lock the first port as a power drawing port, or when probing that the first port is decoupled to power sourcing equipment, and the network device has a power supply for supplying power, change the first port to a powering state. In this way, the first port may adaptively serve as a power drawing port or a power sourcing port according to a coupled device such that manually distinguished a port during device interconnection is not necessary and a coupling error rate is reduced.

20 Claims, 4 Drawing Sheets

(51) Int. Cl.
*G06F 1/26* (2006.01)
*H02J 13/00* (2006.01)
*H04L 12/26* (2006.01)

(52) U.S. Cl.
CPC .... *H02J 13/0062* (2013.01); *H04L 12/40045* (2013.01); *H04L 43/12* (2013.01)

(56) References Cited

U.S. PATENT DOCUMENTS

| | | | |
|---|---|---|---|
| 9,531,551 | B2 | 12/2016 | Balasubramanian et al. |
| 2006/0089230 | A1 | 4/2006 | Biederman et al. |
| 2010/0231054 | A1 | 9/2010 | Togawa |
| 2016/0064938 | A1 | 3/2016 | Balasubramanian et al. |
| 2018/0367319 | A1* | 12/2018 | Hamdi ................. G06F 1/3209 |

FOREIGN PATENT DOCUMENTS

| | | |
|---|---|---|
| JP | 2009260407 A | 11/2009 |
| JP | 2010213068 A | 9/2010 |
| JP | 2015104288 A | 6/2015 |

OTHER PUBLICATIONS

Machine Translation and Abstract of Japanese Publication No. JP2015104288, Jun. 4, 2015, 26 pages.
Foreign Communication From a Counterpart Application, Japanese Application No. 2018-158283, Japanese Office Action dated Jul. 22, 2019, 5 pages.
Foreign Communication From a Counterpart Application, Japanese Application No. 2018-158283, English Translation of Japanese Office Action dated Jul. 22, 2019, 7 pages.
Wang, C., "Universal Serial Bus Power Delivery Specification, Revision 2.0, Version 1.3," XP055514917, Part 1, Jan. 12, 2017, 182 pages.
Wang, C., "Universal Serial Bus Power Delivery Specification, Revision 2.0, Version 1.3," XP055514917, Part 2, Jan. 12, 2017, 182 pages.
Wang, C., "Universal Serial Bus Power Delivery Specification, Revision 2.0, Version 1.3," XP055514917, Part 3, Jan. 12, 2017, 184 pages.
Foreign Communication From a Counterpart Application, European Application No. 18191180.1, Extended European Search Report dated Nov. 20, 2018, 11 pages.

* cited by examiner

PORT ADAPTATION METHOD AND APPARATUS

CROSS-REFERENCE TO RELATED APPLICATION

This application claims priority to Chinese Patent Application No. 201710749681.5 filed on Aug. 28, 2017, which is hereby incorporated by reference in its entirety.

TECHNICAL FIELD

The present disclosure relates to the communications field, and in particular, to a port adaptation method and apparatus.

BACKGROUND

Power over Ethernet (PoE) is a technology used to simultaneously transmit Ethernet data and power using a twisted pair. The power refers to provided electricity. As defined in a PoE standard of the Institute of Electrical and Electronics Engineers (IEEE), a PoE device includes power sourcing equipment (also referred to as PSE), and a powered device (also referred to as PD). The PSE provides power. The PD draws power.

Currently, some network devices serve as both a PSE that supplies power and a PD that draws power. For example, a central access point (AP) in a distributed wireless local area network (WLAN) serves as both a PD that draws power from a switch and a PSE that supplies power to a distributed AP. However, whether a PoE port of the central AP is a power sourcing port (also referred to as a power providing port) or a power drawing port (also referred to as a powered port) cannot be distinguished from an appearance of the PoE port, and consequently a connection error is easily caused.

SUMMARY

This application provides a port adaptation method and apparatus, and a system. A port on a network device may adaptively serve as a power sourcing port or a power drawing port according to a peer connected device such that not only flexibility of setting a device port can be improved, but also a connection error problem during device connection can be avoided, thereby reducing manual installation costs, and improving network deployment efficiency.

According to a first aspect, a port adaptation method is provided, including probing whether a first port of a network device is connected to power sourcing equipment, and maintaining a state of the first port as a powered state or changing the state of the first port to the powered state, and may locking the first port as a power drawing port, such as setting a lock mark, if a probing result is that the first port is connected to power sourcing equipment, or maintaining the state of the first port as a powering state or changing the state of the first port to the powering state if a probing result is that the first port is not connected to power sourcing equipment and the network device has a power supply for supplying power.

In the foregoing port adaptation method, whether the first port of the network device is connected to power sourcing equipment is probed, and if the first port is connected to power sourcing equipment, the first port may adaptively serve as a power drawing port. If the network device has a power supply for supplying power, and the first port is not connected to power sourcing equipment, the first port may be changed to the powering state, and detection is performed on the first port in order to determine whether the first port is used as a power sourcing port. In this way, the first port may adaptively serve as a power drawing port or a power sourcing port according to a connected device. During network deployment, interconnection can be successfully performed without manually distinguishing a power sourcing port from a power drawing port. Therefore, this resolves a connection error problem easily caused during device interconnection, and improves network deployment efficiency.

In a first possible implementation of the first aspect, after changing the state of the first port to the powering state if a probing result is that the first port is not connected to power sourcing equipment, and the network device has a power supply for supplying power, the method includes detecting whether the first port is connected to a valid powered device, and maintaining the powering state of the first port, and may locking the first port as a power sourcing port, if a detection result is valid, or changing the state of the first port to the powered state if a detection result is invalid.

With reference to the first possible implementation of the first aspect, in a second possible implementation of the first aspect, after changing the state of the first port to the powered state if a detection result is invalid, the method includes probing again whether the first port of the network device is connected to power sourcing equipment.

In this way, in an initial phase of device interconnection during network deployment, using state changing of the first port, connection can be successfully performed regardless of whether the first port is connected to power sourcing equipment or a powered device, and without a need to distinguish whether a port is a power sourcing port or a power drawing port. Therefore, network deployment efficiency is improved.

With reference to any one of the first aspect, or the first and the second possible implementations of the first aspect, in a third possible implementation of the first aspect, a switching period is set for the network device, and the state of the first port is changed according to the switching period. Further, the method includes changing the state of the first port to the powering state after the switching period expires if the network device has a power supply for supplying power, and each probing result in the switching period is that the first port is not connected to power sourcing equipment, and changing the state of the first port to the powered state after the switching period expires if each detection result in the switching period is invalid.

In this way, a problem that one probing or detection result is inaccurate, or a frequent changing problem caused by a time window during device interconnection can be avoided.

With reference to any one of the first aspect, or the first to the third possible implementations of the first aspect, in a fourth possible implementation of the first aspect, the method includes continuing to probe whether the first port is connected to power sourcing equipment, if the probing result is that the first port is not connected to power sourcing equipment, and the network device has no power supply for supplying power.

With reference to any one of the first to the fourth possible implementations of the first aspect, in a fifth possible implementation of the first aspect, after locking the first port as a power drawing port, the method includes unlocking the first port if the network device is abnormal or a device connected to the first port changes in order to perform probing on the first port again. In this way, in a network scenario in which a device interconnected with the first port frequently changes, a port does not need to be manually distinguished, and the first port may adaptively serve as a power drawing port or a power sourcing port such that a connection error rate is reduced, and network maintenance efficiency can be improved.

With reference to any one of the first aspect, or the first to the fifth possible implementations of the first aspect, in a sixth possible implementation of the first aspect, the method includes stop performing probing on the first port once it is probed that the first port is connected to power sourcing equipment such that device processing overheads can be reduced, or stop performing probing on the first port when or after the first port is locked as a power drawing port.

According to a second aspect, a port adaptation apparatus is provided, and applied to a network device, where the port adaptation apparatus includes a power sourcing chip, a powered chip, and an adaptation module, the power sourcing chip is connected to the adaptation module, the powered chip is connected to the adaptation module, and the adaptation module is connected to a first port of the network device, and the adaptation module is configured to probe whether the first port is connected to power sourcing equipment, and maintain or change the first port to be connected to the powered chip if a probing result is that the first port is connected to power sourcing equipment such that a powered state of the first port is maintained or the first port is changed to a powered state (when the state of the first port is not the powered state, change the first port to be connected to the powered chip such that the state of the first port is changed to the powered state, or when the state of the first port is the powered state, maintain the state of the first port), and may lock the first port as a power drawing port, or change the first port to be connected to the power sourcing chip if a probing result is that the first port is not connected to power sourcing equipment, and the network device has a power supply for supplying power such that a state of the first port is changed to a powering state.

According to the network device provided in this application, a power sourcing chip and a powered chip are configured for the first port on the network device such that the first port can adaptively serve as a power sourcing port or a power drawing port according to a connected device. In this way, during device interconnection, whether a port is a power sourcing port or a power drawing port does not need to be manually distinguished such that labor costs and a connection error rate are reduced, and network deployment efficiency is improved.

With reference to the second aspect, in a first possible implementation of the second aspect, the power sourcing chip is configured to, if the power sourcing chip is connected to the first port, and the network device has a power supply for supplying power, detect whether the first port is connected to a valid powered device, and feedback a detection result of the first port to the adaptation module, and the adaptation module is further configured to maintain that the first port is connected to the power sourcing chip to maintain the powering state of the first port, and may lock the first port as a power sourcing port, when the detection result of the first port is valid, or change the first port to be connected to the powered chip when the detection result of the first port is invalid such that the state of the first port is changed to the powered state.

With reference to the first possible implementation of the second aspect, in a second possible implementation of the second aspect, a switching period is set for the adaptation module, and the adaptation module is configured to change the state of the first port according to the switching period if the network device has a power supply for supplying power, and the adaptation module is further configured to change the first port to the powered state after the switching period expires when each detection result of the first port in the switching period is invalid.

With reference to any one of the second aspect, or the first and the second possible implementations of the second aspect, in a third possible implementation of the second aspect, the adaptation module is further configured to probe, in the switching period, whether the first port is connected to power sourcing equipment, and when each probing result in the switching period is invalid (that is, each probing result is that the first port is not connected to power sourcing equipment), after the switching period expires, change the first port to be connected to the power sourcing chip.

In this way, a problem that one probing or detection result is inaccurate, or overheads caused by frequent changing in a device interconnection process can be avoided.

With reference to any one of the second aspect, or the first to the third possible implementations of the second aspect, in a fourth possible implementation of the second aspect, the adaptation module is further configured to continue to probe whether the first port is connected to power sourcing equipment, if the probing result is that the first port is not connected to power sourcing equipment, and the network device has no power supply for supplying power.

With reference to any one of the second aspect, or the first to the fourth possible implementations of the second aspect, in a fifth possible implementation of the second aspect, the adaptation module is further configured to stop performing probing on the first port once probing the first port is connected to power sourcing equipment such that device processing overheads can be reduced, or stop performing probing on the first port when or after locking the first port as a power drawing port, and after locking the first port as a power drawing port, the adaptation module is further configured to unlock the first port if the network device is abnormal, or a device connected to the first port changes in order to perform probing on the first port again.

With reference to any one of the second aspect, or the first to the fifth possible implementations of the second aspect, in a sixth possible implementation of the second aspect, the adaptation module includes a voltage detector, a switching switch, and a controller, the voltage detector is connected to the first port, the power sourcing chip is connected to the switching switch, and the powered chip is connected to the switching switch, the switching switch is connected to the first port, the voltage detector is configured to probe whether a valid input voltage exists on the first port in order to probe whether the first port is connected to power sourcing equipment, and feedback a probing result of the first port to the controller, the controller is configured to, if the probing result is that the first port is connected to power sourcing equipment, and the state of the first port is not the powered state (a disconnected state or the powering state), send a first instruction to the switching switch, where the first instruction is used to instruct the switching switch to connect the first port and the powered chip such that the state of the first port is changed to the powered state, and may lock the first port as a power drawing port, and the controller is further configured to, if the probing result is that the first port is not connected to power sourcing equipment, and the network device has a power supply for supplying power, send a second instruction to the switching switch, where the second instruction is used to instruct the switching switch to connect the first port and the power sourcing chip such that the state of the first port is changed to the powering state.

With reference to the sixth possible implementation of the second aspect, in a seventh possible implementation of the second aspect, the controller is further configured to receive a detection result of the first port fed back by the power sourcing chip, and when the detection result of the first port is valid, lock the first port as a power sourcing port, or when the detection result of the first port is invalid, send the first instruction to the switching switch to instruct the switching switch to connect the first port and the powered chip such that the state of the first port is changed to the powered state.

Optionally, the controller is further configured to send the first instruction to the switching switch after the switching period expires when each detection result of the first port in the switching period is invalid such that the state of the first port is changed to the powered state.

With reference to any one of the sixth or the seventh possible implementation of the second aspect, in an eighth possible implementation of the second aspect, the controller is configured to send the second instruction to the switching switch after the switching period expires when each probing result of the first port in the switching period is invalid (no power sourcing equipment is connected) such that the state of the first port is changed to the powering state.

With reference to any one of the sixth to the eighth possible implementations of the second aspect, in a ninth possible implementation of the second aspect, the switching switch is configured to receive the first instruction sent by the controller, and connect the first port and the powered chip according to the first instruction, and the switching switch is further configured to receive the second instruction sent by the controller, and connect the first port and the power sourcing chip according to the second instruction.

With reference to any one of the sixth to the ninth possible implementations of the second aspect, in a tenth possible implementation of the second aspect, after the locking the first port as a power drawing port, the controller is further configured to unlock the first port if the network device is abnormal or the device connected to the first port changes in order to perform probing on the first port again.

According to a third aspect, a network device is provided, the network device includes a first port and the port adaptation apparatus according to any one of the second aspect and the possible implementations of the second aspect, and the port adaptation apparatus corresponds to the first port.

Optionally, the network device further includes a second port, and the second port is connected to a power sourcing chip and is a power sourcing port. Further, optionally, the network device further includes a third port, and the third port is connected to a powered chip and is a power drawing port.

Optionally, the network device further includes a processor and a memory.

According to a fourth aspect, a power supply system is provided, including power sourcing equipment, an intermediate device, and a powered device, a first port of the intermediate device is connected to the power sourcing equipment, a second port of the intermediate device is connected to the powered device, the intermediate device includes a first port adaptation apparatus according to any one of the second aspect and the possible implementations of the second aspect, and a second port adaptation apparatus according to any one of the second aspect and the possible implementations of the second aspect, the first port adaptation apparatus corresponds to the first port, and the second port adaptation apparatus corresponds to the second port.

Optionally, the power sourcing equipment includes the port adaptation apparatus according to any one of the second aspect and the possible implementations of the second aspect.

Optionally, the powered device includes the port adaptation apparatus according to any one of the second aspect and the possible implementations of the second aspect.

According to a fifth aspect, a computer storage medium is provided, and configured to store a computer program, where the computer program includes instructions used to execute the port adaptation method in the first aspect.

DESCRIPTION OF EMBODIMENTS

The following describes technical solutions provided in this application with reference to the accompanying drawings and specific implementations.

Figure 1:
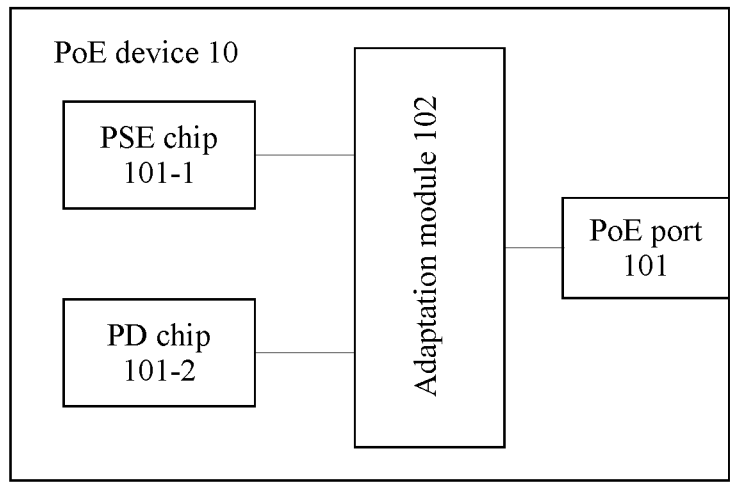
FIG. 1 is a schematic structural diagram of a PoE device according to an embodiment of the present disclosure.

Referring to FIG. 1, FIG. 1 is a schematic structural diagram of a PoE device 10 according to an embodiment of the present disclosure. The PoE device 10 includes a PoE port 101, an adaptation module 102, a PSE chip 101-1, and a PD chip 101-2. The PSE chip 101-1 and the PD chip 101-2 are separately connected to the adaptation module 102, and the PoE port 101 is connected to the adaptation module 102.

The PSE chip 101-1 is connected to a power management system (not shown) of the PoE device 10, and may draw power from the power management system. The PD chip 101-2 is connected to the power management system of the PoE device 10, and may provide power for the power management system.

The adaptation module 102 is configured to probe whether the PoE port 101 is connected to power sourcing equipment, and if a probing result is that the PoE port 101 is connected to power sourcing equipment, maintain that the PoE port 101 is connected to the PD chip 101-2 or change the PoE port 101 to be connected to the PD chip 101-2 such that a powered state of the PoE port 101 is maintained or the PoE port 101 is changed to a powered state, and lock the PoE port 101 as a power drawing port, such as setting a lock mark (the state of the PoE port 101 is not to be changed), or if a probing result is that the PoE port 101 is not connected to power sourcing equipment, and the PoE device 10 has a power supply for supplying power, change the PoE port 101 to be connected to the PSE chip 101-1 such that a state of the PoE port 101 is changed to a powering state.

The PoE port 101 may be in any state at an initial moment. A port state includes a disconnected state, a PSE state, and a PD state. The disconnected state indicates that the PoE port 101 is neither connected to the PSE chip 101-1 nor connected to the PD chip 101-2. A first state is also referred to as a powering state or a PSE state, and indicates that the PoE port 101 is connected to the PSE chip (or power sourcing chip) 101-1. A second state is also referred to as a powered state or a PD state, and indicates that the PoE port 101 is connected to the PD chip (or powered chip) 101-2.

If the PoE device 10 has no power supply for supplying power, regardless of the state of the PoE port 101, the adaptation module 102 probes whether the PoE port 101 is connected to power sourcing equipment. When probing that the PoE port 101 is connected to power sourcing equipment, the adaptation module 102 maintains the PD state of the PoE port 101 or changes the state of the PoE port 101 to the PD state (that is, maintains that the PoE port 101 is connected to the PD chip 101-2 or changes the PoE port 101 to be connected to the PD chip 101-2), and locks the PoE port 101 as a power drawing port. Further, if the PoE port 101 is in the PD state, the PD state of the PoE port 101 is maintained (that is, that the PoE port 101 is connected to the PD chip 101-2 is maintained). In a specific implementation, when maintaining the PD state, the adaptation module may not perform any operation. If the state of the PoE port 101 is not the PD state (but the PSE state or the disconnected state), the PoE port 101 is changed to be connected to the PD chip 101-2. In addition, the adaptation module 102 may stop probing. When the PoE port 101 is not connected to power sourcing equipment, the adaptation module 102 continuously performs probing on the PoE port 101.

If the PoE device 10 has a power supply for supplying power, and the PoE port 101 is in the PD state or the disconnected state, the adaptation module 102 probes whether the PoE port 101 is connected to power sourcing equipment. When probing that the PoE port 101 is connected to power sourcing equipment, the adaptation module 102 maintains the PD state of the PoE port 101 or changes the PoE port 101 to the PD state (that is, maintains that the PoE port 101 is connected to the PD chip 101-2 or changes the PoE port 101 to be connected to the PD chip 101-2), and locks the PoE port 101 as a power drawing port. In addition, the adaptation module 102 may stop probing. When the PoE port 101 is not connected to power sourcing equipment, the PoE port 101 is changed to the PSE state.

If the PoE device 10 has a power supply for supplying power, and the PoE port 101 is in the PSE state, the PSE chip 101-1 detects whether the PoE port is connected to a valid PD. Further, the PSE chip 101-1 may send a detection voltage to the PoE port 101 to measure impedance of the PoE port 101, and may determine, according to the measured impedance, whether the PoE port 101 is connected to a valid PD to obtain a detection result. The detection result may be valid or invalid. When the detection result is valid, it indicates that the PoE port 101 is connected to a valid PD. When the detection result is invalid, it indicates that the PoE port 101 is not connected to a valid PD or is not connected to any device. The PSE chip 101-1 may feedback the detection result to the adaptation module 102. In addition, the PSE chip 101-1 stops detection. When the detection result indicates a valid PD, the adaptation module 102 maintains the PSE state of the PoE port 101 (that is, maintains that the PoE port 101 is connected to the PSE chip 101-1), and locks the PoE port 101 as a power sourcing port. In a specific implementation, when maintaining the PSE state of the PoE port 101, the adaptation module may not perform any operation. When the detection result is invalid, the adaptation module 102 changes the PoE port 101 to be connected to the PD chip 101-2 such that the PoE port 101 is changed to the PD state.

In this embodiment of the present disclosure, a power supply for supplying power may be implemented using PoE, or a local power supply (such as an adapter power supply) for supplying power.

In a specific implementation, to avoid frequent changing, the adaptation module 102 may set a switching period, that is, set a time limit of state changing of the PoE port 101. In this time limit, even if each probing or detection result meets a switching condition, changing is not immediately performed, but changing is performed after the time limit expires. In one switching period, the state of the PoE port 101 may be maintained. After the switching period expires, if the switching condition is met, the PoE port 101 may be changed from one state to another state. For example, the disconnected state of the PoE port 101 is changed to the PSE state or the PD state of the PoE port 101. For another example, the PSE state of the PoE port 101 is changed to the PD state of the PoE port 101. Alternatively, the PD state of the PoE port 101 is changed to the PSE state of the PoE port 101.

It may be understood that only when the PoE device 10 has a power supply for supplying power, the adaptation module 102 can change the port state, and the switching period can take effect.

If the PoE device 10 has no power supply for supplying power, and the PoE port 101 is not connected to power sourcing equipment, the adaptation module 102 does not change the port state, can only continuously perform probing on the PoE port 101, and can perform changing only after probing that the PoE port 101 is connected to power sourcing equipment. For example, the disconnected state is changed to the PD state (it may be understood that changing may not be performed in this case, for example, if the state of the PoE port 101 is the PD state, the PD state of the PoE port 101 is maintained), and further the adaptation module 102 locks the PoE port 101 as a power drawing port.

Only when the PoE device 10 has a power supply for supplying power, the PSE chip 101-1 can work, and the PoE port 101 may serve as a power sourcing port.

The adaptation module 102 may perform probing on the PoE port 101 for a plurality of times in one switching period.

If the adaptation module 102 probes that the PoE port 101 is connected to power sourcing equipment, the adaptation module 102 maintains the PD state or changes the state of the PoE port 101 to the PD state (may immediately change the PoE port 101 to the PD state, or may change the PoE port 101 to the PD state after the switching period expires), and locks the PoE port 101 as a power drawing port, such as setting a lock mark (the state of the PoE port 10 is not to be changed after locking). The PoE port 101 is locked as a power drawing port. In addition, if the PoE port 101 is locked as a power drawing port, the adaptation module 102 may stop probing, and may also stop timing of the switching period. It may be understood that timing of the switching period may be stopped after it is probed that the PoE port 101 is connected to power sourcing equipment. Subsequently, if the PoE device 10 is abnormal (for example, the PD chip 101-2 is faulty, or the PoE device 10 is faulty), or a device connected to the PoE port 101 changes (for example, connected power sourcing equipment is disconnected or faulty), the PoE port 101 is unlocked (the PoE port 101 may enter the disconnected state, the PD state, or the PSE state) such that a port adaptation process described in this embodiment of the present disclosure is performed on the PoE port 101 again. Details are not described herein.

If the adaptation module 102 probes that the PoE port 101 is not connected to power sourcing equipment in the switching period (in the switching period, the PoE port 101 is not connected to power sourcing equipment during each time of probing), the adaptation module 102 may change the state of the PoE port 101 after the switching period expires. Further, the adaptation module 102 changes the PoE port 101 to the PSE state (that is, changes the PoE port 101 to be connected to the PSE chip 101-1).

In a specific implementation, the PSE chip 101-1 may perform detection on the PoE port 101 for a plurality of times in one switching period.

If the PSE chip 101-1 detects that the PoE port 101 is connected to a valid PD, the PSE chip 101-1 may feedback a detection result (valid) to the adaptation module 102. The PSE chip 101-1 may stop detection after detecting that the PoE port 101 is connected to a valid PD. The adaptation module 102 may lock the PoE port 101 as a power sourcing port. If the PoE port 101 is locked as a power sourcing port, the adaptation module 102 does not need to change the state of the PoE port, and may stop timing of the switching period. Subsequently, if the PoE device 10 is abnormal (for example, the PSE chip 101-1 is faulty, or the PoE device 10 is faulty, or a power supplying status of the PoE device 10 changes (from having a power supply for supplying power to having no power supply for supplying power)), or a device connected to the PoE port 101 changes (the connected device is disconnected or faulty), or the like, the PoE port 101 is unlocked (the PoE port 101 may enter the disconnected state, the PD state, or the PSE state) such that the port adaptation process described in this embodiment of the present disclosure is performed on the PoE port 101 again. Details are not described herein.

If the adaptation module 102 detects that the PoE port 101 is not connected to a valid PD in the switching period (each detection result in the switching period is invalid), the adaptation module 102 may change the state of the PoE port 101 after the switching period expires. Further, the adaptation module 102 changes the PoE port 101 to the PD state (that is, changes the PoE port 101 to be connected to the PD chip 101-2).

In this embodiment of the present disclosure, the switching period may be determined based on duration required by the adaptation module 102 to perform one time of probing and duration required by the PSE chip 101-1 to perform one time of detection. For example, the switching period is set to an integer multiple of the longer one of the duration required for one time of probing and the duration required for one time of detection. This is not limited in the present disclosure.

In a specific implementation, in the switching period, the adaptation module 102 may stop performing probing on the PoE port 101 once probing that the PoE port 101 is connected to power sourcing equipment, but not when or after locking the PoE port 101 as a power drawing port. Once detecting that the PoE port 101 is connected to a valid PD, the PSE chip 101-1 stops performing detection on the PoE port 101. After probing or detection is stopped, if the PoE device 10 is abnormal, or the device connected to the PoE port 101 is disconnected, or the like, the PoE port 101 may be unlocked (the PoE port 101 may enter the disconnected state, the PD state, or the PSE state) in order to perform detection or probing on the PoE port 101 again.

In this embodiment of the present disclosure, the PoE port 101 may adaptively serve as a power sourcing port or a power drawing port according to the connected device.

The PoE device 10 in this embodiment of the present disclosure may be an Ethernet device that supports PoE, such as a switch, a router, or an AP. The PSE chip 101-1 is designed to meet a PSE function in a PoE protocol requirement, and usually provides a function such as detection and classification.

In addition to the PoE port 101, the PoE device 10 may include another PoE port. The other PoE port may be a power sourcing port directly connected to the PSE chip 101-1, or may be a power drawing port directly connected to the PD chip 101-2, or may be an adaptive port like the PoE port 101. This is not limited in the present disclosure.

Figure 2:
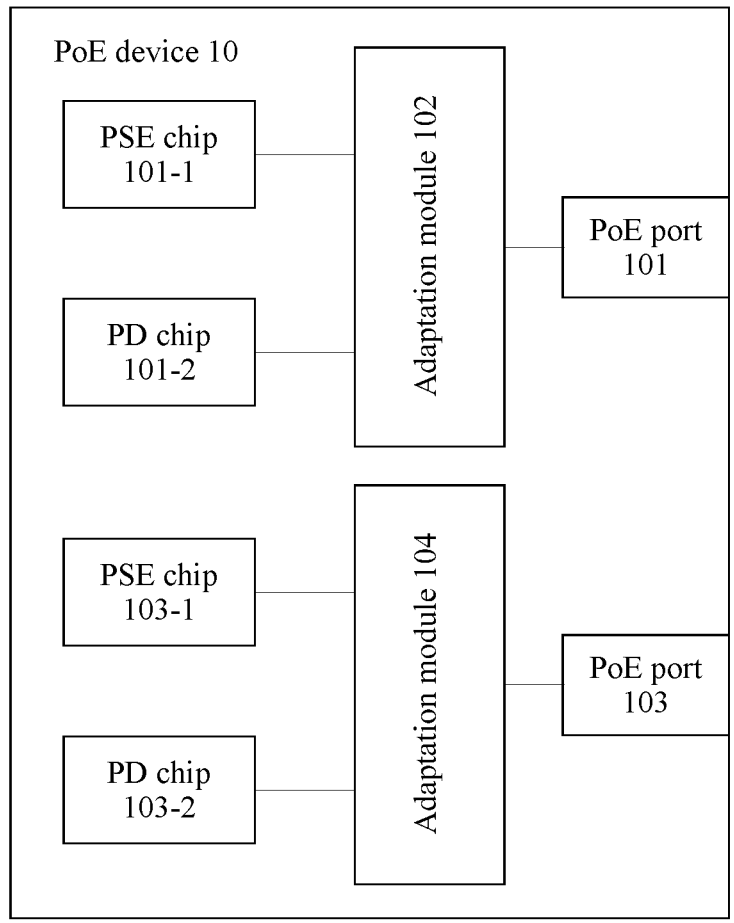
FIG. 2 is a schematic structural diagram of another PoE device according to an embodiment of the present disclosure.

For example, as shown in FIG. 2, the PoE device 10 further includes a PoE port 103, an adaptation module 104, a PSE chip 103-1, and a PD chip 103-2. The PSE chip 103-1 and the PD chip 103-2 correspond to the PoE port 103. The adaptation modules 102 and 104 may be separately disposed, or may be integrated, and this is not limited in the present disclosure.

Further, the PoE device 10 further includes a processor (not shown), such as a central processing unit (CPU), a network processor (NP), or a combination of a CPU and an NP. The processor is used by the PoE device 10 to communicate with another device. For example, the PoE device 10 performs supply power negotiation, data transmission, and the like at a data link layer with interconnected power sourcing equipment or an interconnected powered device.

Optionally, the PoE device 10 further includes a memory (not shown) configured to store data or a program, or data and a program. The memory may include a volatile memory, such as a random access memory (RAM). The memory may include a nonvolatile memory, such as a flash memory, a hard disk drive (HDD), or a solid state drive (SSD). The memory may further include a combination of the foregoing memories.

In this embodiment of the present disclosure, for a PoE device that can be used as power sourcing equipment or a powered device, a PSE chip and a PD chip are disposed for a PoE port on the PoE device such that the PoE port can adaptively serve as a power sourcing port or a power drawing port according to a connected device. In this way, when device interconnection is performed during network deployment, connection can be successfully performed without distinguishing whether a port is a power sourcing port or a power drawing port in order to resolve a connection error problem.

The PoE device provided in this embodiment of the present disclosure describes only an example of connection relationships and functions of components, modules, and the like that are in the PoE device and that are related to the present disclosure. Persons skilled in the art may understand that the PoE device may further include another component according to a function and a service requirement. For example, if the PoE device is a wireless AP, the PoE device may further include a WLAN chip, an antenna, and the like. This is not limited in the present disclosure.

Figure 3:
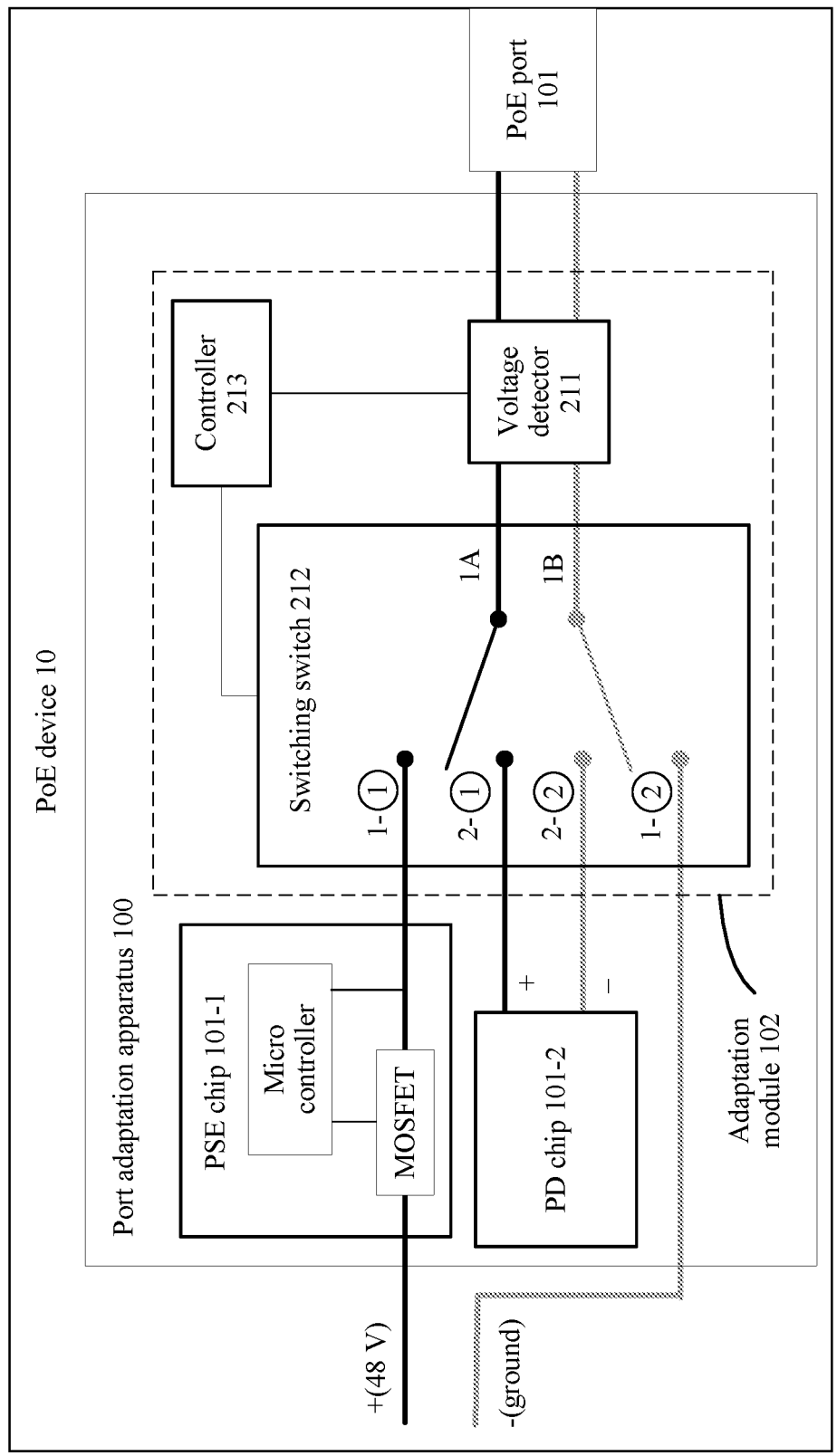
FIG. 3 is a schematic circuit diagram of a port adaptation apparatus in a PoE device according to an embodiment of the present disclosure.

Referring to FIG. 3, FIG. 3 is a schematic circuit diagram of a port adaptation apparatus 100 in a PoE device 10 according to an embodiment of the present disclosure. As shown in FIG. 3, the port adaptation apparatus 100 includes a PSE chip 101-1, a PD chip 101-2, a voltage detector 211, a switching switch 212, and a controller 213.

The port adaptation apparatus 100 corresponds to a PoE port 101 of the PoE device 10. The port adaptation apparatus 100 is configured to enable the PoE port 101 to adaptively serve as a power sourcing port or a power drawing port.

The PSE chip 101-1 is connected to a power supply system, and may supply power to a peer powered device (for example, provides 48 volts (V) voltage). The PD chip 101-2 may draw power from peer power sourcing equipment and provide power for the power supply system of the PoE device 10.

Optionally, the voltage detector 211, the switching switch 212, and the controller 213 are considered as one implementation of the adaptation module 102 shown in FIG. 1.

The switching switch 212 may be understood as a double pole double throw switch, and may be implemented using a metal-oxide semiconductor field-effect transistor (MOSFET), a relay, an optocoupler, a transistor, and the like. The double pole double throw switch may also be understood as two single pole double throw switches that are controlled according to a unified rule, that is, two single pole double throw switches that work at the same time. FIG. 3 includes a schematic diagram of the switching switch 212.

The switching switch 212 is configured to connect the PoE port 101 and the PSE chip 101-1, or connect the PoE port 101 and the PD chip 101-2. Further, referring to FIG. 3, when 1A is connected to 1-①, 1B is connected to 1-② at the same time such that the PoE port 101 is connected to the PSE chip 101-1. When 1A is connected to 2-①, 1B is connected to 2-② the same time such that the PoE port 101 is connected to the PD chip 101-2.

The controller 213 is configured to control the switching switch 212.

The switching switch 212 shown in FIG. 3 is in a disconnected state. The PoE port 101 is neither connected to the PSE chip 101-1 nor connected to the PD chip 101-2. That is, the PoE port 101 is in the disconnected state.

The voltage detector 211 is configured to probe whether a valid input voltage exists on the PoE port 101 in order to probe whether the PoE port 101 is connected to power sourcing equipment, and feedback a probing result of the PoE port 101 to the controller 213.

The valid input voltage is a voltage that meets a PoE standard specification, for example, 2.8 V to 57 V, including a detection voltage in a detection phase, or a classification voltage in a classification phase, or a voltage in a power-on phase, or a supply voltage in a powering phase.

The probing result may be valid or invalid. The probing result is valid, that is, the PoE port 101 has a valid input voltage, indicating that the PoE port 101 is connected to power sourcing equipment. The probing result is invalid, that is, the PoE port 101 has no valid input voltage, indicating that the PoE port 101 is not connected to power sourcing equipment. When the probing result is invalid, the PoE port 101 may be connected to non-power sourcing equipment (for example, a powered device, or a common non-PoE device), or the PoE port 101 may be not connected to any device.

The controller 213 is configured to, if the probing result is that the PoE port 101 is connected to power sourcing equipment, and the PoE port 101 is in the disconnected state or the PSE state, send a first instruction to the switching switch 212, where the first instruction is used to instruct the switching switch 212 to connect the PoE port 101 and the PD chip 101-2 such that the state of the PoE port 101 is changed to the powered state, and then lock the PoE port 101 as a power drawing port, such as setting a lock mark in order to maintain that the PoE port 101 is connected to the PD chip 101-2.

The controller 213 is further configured to, if the probing result is that the PoE port 101 is not connected to power sourcing equipment, and the PoE device 10 has a power supply for supplying power, send a second instruction to the switching switch 212, where the second instruction is used to instruct the switching switch 212 to connect the PoE port 101 and the PSE chip 101-1 such that the state of the PoE port 101 is changed to the powering state.

If the PoE device 10 has no power supply for supplying power, regardless of the state of the PoE port 101, the voltage detector 211 probes whether the PoE port 101 has a valid input voltage. If a probing result is invalid (the PoE port 101 is not connected to power sourcing equipment), the voltage detector 211 continuously performs probing on the PoE port 101. If the probing result is valid, the voltage detector 211 feeds back the probing result to the controller 213.

If the PoE device 10 has a power supply for supplying power, and the PoE port 101 is in the disconnected state or the PD state, the voltage detector 211 probes whether the PoE port 101 has a valid input voltage, and feeds back a probing result to the controller 213. If the probing result is valid, the controller 213 maintains the powered state of the PoE port 101 (maintains that the PoE port 101 is connected to the PD chip 101-2) when the PoE port 101 is in the PD state, and sends the first instruction to the switching switch 212 when the PoE port 101 is in the disconnected state, to instruct the switching switch 212 to connect the PoE port 101 and the PD chip 101-2 such that the state of the PoE port 101 is changed to the powered state, and then the controller 213 locks the PoE port 101 as a power drawing port. If the probing result is invalid, the controller 213 sends the second instruction to the switching switch 212 to instruct the switching switch 212 to connect the PoE port 101 and the PSE chip 101-1 such that the PoE port 101 is changed to the PSE state.

If the PoE device 10 has a power supply for supplying power, and the PoE port 101 is in the PSE state (that is, the PSE chip 101-1 is connected to the PoE port 101), the PSE chip 101-1 detects whether the PoE port 101 is connected to a valid PD, and feeds back a detection result to the controller 213. The detection result may be valid or invalid. When the detection result is valid, it indicates that the PoE port 101 is connected to a valid PD. When the detection result is invalid, it indicates that the PoE port 101 is not connected to a valid PD or is not connected to any device.

It may be understood that the PSE chip 101-1 can work only when the PoE device 10 has a power supply for supplying power. If the PoE device 10 has no power supply for supplying power, the PSE chip 101-1 does not work.

The controller 213 is further configured to receive the detection result of the PoE port 101 fed back by the power sourcing chip, and if the detection result of the PoE port 101 is valid, lock the PoE port 101 as a power sourcing port (maintain that the PoE port 101 is connected to the PSE chip 101-1), or if the detection result of the PoE port 101 is invalid, send the first instruction to the switching switch 212, to instruct the switching switch 212 to connect the PoE port 101 and the PD chip 101-2, and switch the PoE port 101 to the PD state. After the PoE port 101 is changed to the PD state, the voltage detector 211 probes again whether the PoE port 101 has a valid input voltage in order to probe whether the PoE port 101 is connected to power sourcing equipment.

If the PoE device 10 has a power supply for supplying power, whether the PoE port 101 is connected to power sourcing equipment or whether the PoE port 101 is connected to a valid PD can be probed or detected in a timely manner by performing switching between the PSE state and the PD state.

The controller 213 is further configured to unlock the PoE port 101. After unlocking, the PoE port 101 may be in the disconnected state, the PSE state, or the PD state.

The controller 213 may use one bit in a register as a lock mark to lock or unlock the PoE port 101. For example, the bit being 1 represents locked, and the bit being 0 represents unlocked. The register may be a register of the PoE port 101, or may be a register of the controller. The controller 213 may also set and store the lock mark in a memory. The lock mark may also be set in the switching switch 212 and operated by the controller 213. During locking, the switching switch 212 cannot perform switching, and after unlocking, the switching switch 212 can perform switching. Further, there may be a plurality of different implementations, and this is not limited in the present disclosure.

The controller 213 may set a switching period that is used to periodically change the state of the PoE port 101. In one switching period, the state of the PoE port 101 is unchanged such that the voltage detector 211 can perform probing on the PoE port 101, or the PSE chip 101-1 can perform detection on the PoE port 101. After the switching period expires, the controller 213 controls the switching switch 212 to change the state of the PoE port 101. Further, when a probing result of the PoE port 101 is invalid, the controller 213 sends the second instruction to the switching switch 212 to instruct the switching switch 212 to connect the PoE port 101 and the PSE chip 101-1. When a detection result of the PoE port 101 is invalid, the controller 213 sends the first instruction to the switching switch 212, to instruct the switching switch 212 to connect the PoE port 101 and the PD chip 101-2. It may be understood that the switching period takes effect only when the PoE device 10 has a power supply for supplying power.

In one switching period, the voltage detector 211 may perform probing on the PoE port 101 for a plurality of times, and the PSE chip 101-1 may perform detection on the PoE port 101 for a plurality of times. Once the voltage detector 211 probes that the PoE port 101 has a valid input voltage, the voltage detector 211 may stop probing, and feedback a probing result (valid) of the PoE port 101 to the controller 213. Once the PSE chip 101-1 detects that the PoE port 101 is connected to a valid PD, the PSE chip 101-1 may stop detection, and feedback a detection result (valid) of the PoE port 101 to the controller 213.

If the PoE device 10 has a power supply for supplying power, the voltage detector 211 may feedback a probing result to the controller 213 after each time of probing. The voltage detector 211 may alternatively feedback a probing result to the controller 213 only when the probing result is valid. Then, a new switching period starts, and the probing result of the PoE port 101 is invalid by default. Similarly, the PSE chip 101-1 may feedback a detection result to the controller 213 after each time of detection. The PSE chip 101-1 may alternatively feedback a detection result to the controller 213 only when the detection result is valid. Then, a new switching period starts, and the detection result of the PoE port 101 is invalid by default. The controller 213 may record a probing or detection result of the PoE port 101, for example, record the detection result into a register corresponding to the PoE port 101.

After locking the PoE port 101 as a power sourcing port or a power drawing port, the controller 213 may stop timing of the switching period.

After locking the PoE port 101, if the PoE device 10 is abnormal or a device connected to the PoE port 101 changes, the controller 213 unlocks the PoE port 101. After unlocking, the PoE port 101 may enter the disconnected state, the PD state, or the PSE state.

The PSE chip 101-1 shown in FIG. 3 controls a positive electrode (48 V) of a power supply using a switch (the MOSFET is used as an example in FIG. 3). In a specific implementation, a negative electrode (ground) of the power supply may further be controlled using the switch. In addition, the switch (MOSFET) in the PSE chip 101-1 in FIG. 3 may alternatively be disposed outside the PSE chip 101-1, and a working principle is similar. A structure of the PSE chip 101-1 shown in FIG. 3 in this embodiment of the present disclosure is merely an example, and this imposes no limitation on the present disclosure.

In this embodiment of the present disclosure, a port adaptation apparatus 100 is disposed for the PoE port 101 on the PoE device 10. The port adaptation apparatus 100 ensures that the PoE port 101 adaptively serves as a power sourcing port or a power drawing port according to an interconnected device without a need to distinguish whether a port is a power sourcing port or a power drawing port in order to resolve a connection error problem.

An embodiment of the present disclosure further provides a power supply system, including power sourcing equipment, an intermediate device, and a powered device. The intermediate device uses the PoE device 10 shown in FIG. 2. A first port of the intermediate device is connected to the power sourcing equipment, a second port of the intermediate device is connected to the powered device, the intermediate device includes a first port adaptation apparatus and a second port adaptation apparatus shown in FIG. 3, the first port adaptation apparatus is connected (corresponding) to the first port, and the second port adaptation apparatus is connected (corresponding) to the second port. The power sourcing equipment is configured to supply power to the intermediate device. The powered device is configured to draw power from the intermediate device.

Figure 4:
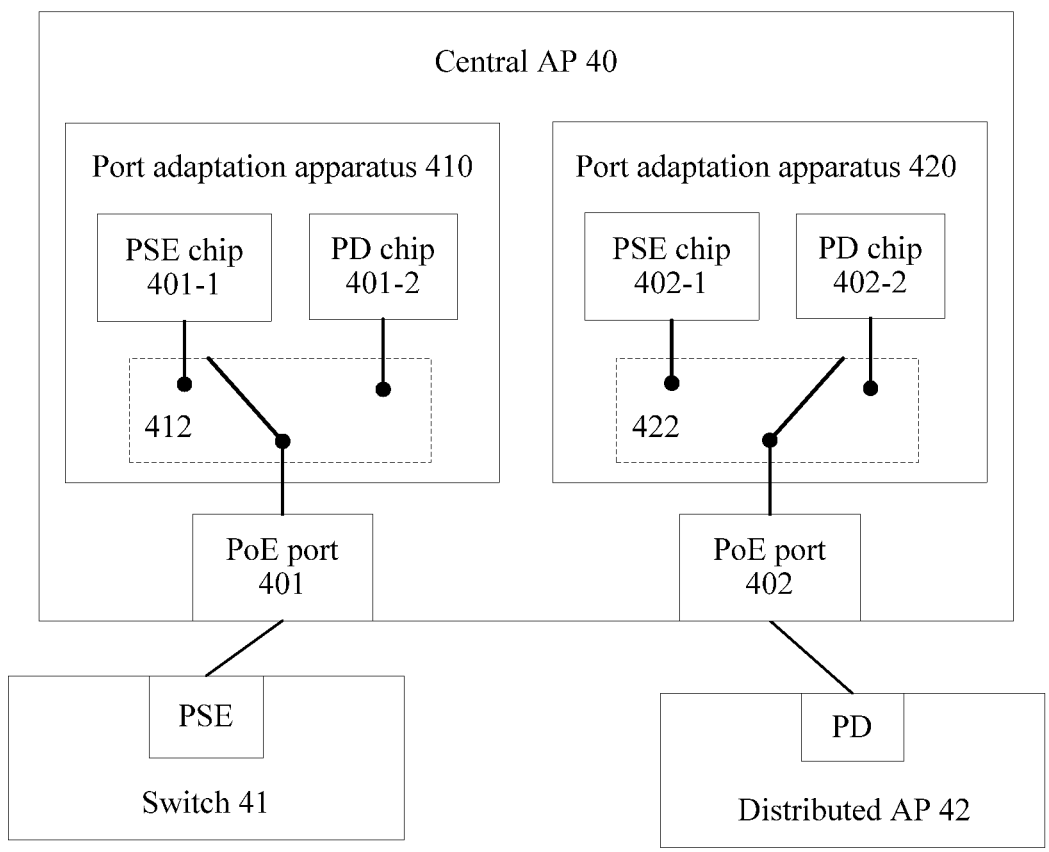
FIG. 4 is a schematic topology diagram of a distributed WLAN according to an embodiment of the present disclosure.

FIG. 4 is a distributed WLAN according to an embodiment of the present disclosure, and may be understood as a specific implementation of the foregoing power supply system. The distributed WLAN uses a PoE device 10 provided in this embodiment of the present disclosure as a central AP 40 that is upstream connected to a switch 41 and downstream connected to a distributed AP 42. The switch 41 is power sourcing equipment, and may supply power to the central AP 40. The distributed AP 42 is a powered device, and may draw power from the central AP 40. A PoE port 401 of the central AP 40 is connected to the switch 41, and a PoE port 402 is connected to the distributed AP 42.

As shown in FIG. 4, one port adaptation apparatus is disposed on each of the PoE ports 401 and 402 corresponding to the central AP 40. For a structure, refer to FIG. 3, and FIG. 4 is merely a simplified schematic diagram. Further, a port adaptation apparatus 410 is correspondingly disposed on the PoE port 401, includes a PSE chip 401-1, a PD chip 401-2, and a switch 412, and further includes a voltage detector (not shown) and a controller (not shown in FIG. 4). A port adaptation apparatus 420 is correspondingly disposed on the PoE port 402, includes a PSE chip 402-1, a PD chip 402-2, and a switch 422, and further includes a voltage detector (not shown) and a controller (not shown in FIG. 4).

The central AP 40 performs a port adaptation method (shown in FIG. 5) provided in this embodiment of the present disclosure such that the PoE port adaptively serves as a power sourcing port or a power drawing port. Therefore, the central AP 40 serves as a PD to draw power from the switch 41, and also serves as a PSE to supply power to the distributed AP 42.

In FIG. 4, a PSE port of the switch 41 that is connected to the central AP 40 is a power sourcing port, and represents a port directly connected to a PSE chip. A PD port of the distributed AP 42 that is connected to the central AP 40 is a power drawing port, and represents a port directly connected to a PD chip. In a specific implementation, the switch 41 may further include an adaptive PoE port and a port adaptation apparatus shown in FIG. 3. The distributed AP 42 may further include an adaptive PoE port and a port adaptation apparatus shown in FIG. 3. The central AP 40 may further include a power sourcing port directly connected to a PSE chip, and a power drawing port directly connected to a PD chip.

Figure 5:
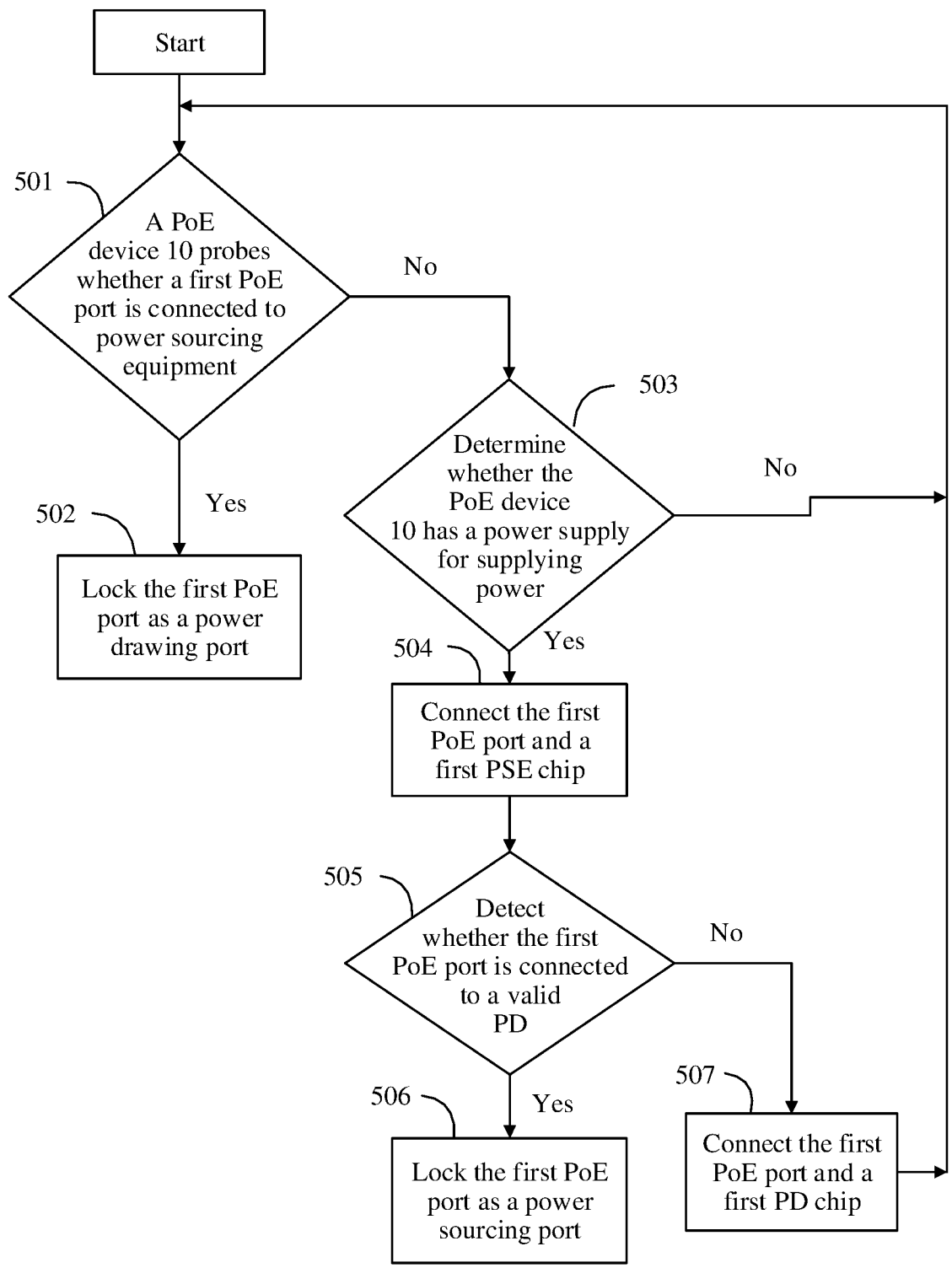
FIG. 5 is a flowchart of a port adaptation method according to an embodiment of the present disclosure.

Referring to FIG. 5, FIG. 5 is a port adaptation method according to an embodiment of the present disclosure. A PoE device 10 may include a plurality of adaptive PoE ports, and a processing process of each adaptive PoE port is independent of each other. In FIG. 5, any adaptive PoE port, for example, a first PoE port of the PoE device 10 is used as an example for description. The port adaptation method includes the following steps.

Step 501: Probe whether the first PoE port of the PoE device 10 is connected to power sourcing equipment.

In the PoE device 10, a first port adaptation apparatus is correspondingly disposed for the first PoE port. The first port adaptation apparatus includes a first PSE chip, a first PD chip, a first switching switch, a first voltage detector, and a first controller. For a specific structure, refer to FIG. 3.

In a first case, the PoE device 10 has no power supply for supplying power.

Regardless of a state of the first PoE port (a disconnected state, a PSE state, or a PD state), the PoE device 10 probes whether the first PoE port is connected to power sourcing equipment.

In a second case, the PoE device 10 has a power supply for supplying power. When the first PoE port is in a disconnected state or a PD state, the PoE device 10 probes whether the first PoE port is connected to power sourcing equipment.

The probing whether the first PoE port is connected to power sourcing equipment includes probing, by the PoE device 10 (the first voltage detector), whether the first PoE port has a valid input voltage.

If yes, that is, a probing result is valid (there is a valid input voltage), it indicates that the first PoE port is connected to power sourcing equipment, and then step 502 continues.

If no, that is, a probing result is invalid (there is no valid input voltage), it indicates that the first PoE port is not connected to power sourcing equipment, and then step 503 continues. If a switching period is set, probing is performed for a plurality of times according to the switching period, and a next step is performed after the switching period expires.

In FIG. 4, for example, the central AP 40 is the PoE device 10. When a network is just deployed, the PoE port 401 is in the disconnected state, and the central AP 40 probes whether the PoE port 401 is connected to power sourcing equipment. Similarly, the central AP 40 probes whether the PoE port 402 is connected to power sourcing equipment.

If the first PoE port is connected to the first PSE chip, and the PoE device 10 has a power supply for supplying power, it may be understood that step 504 is directly performed.

Step 502: Lock the first PoE port as a power drawing port.

If the PoE device 10 probes that the first PoE port is connected to power sourcing equipment, the PoE device 10 locks the first PoE port as a powered port in order to maintain that the first PoE port is connected to the first PD chip. Further, a lock mark may be set, the first PoE port is locked as a powered port, and the state of the first PoE port is locked. If the switching period is set, timing of the switching period may be further stopped.

FIG. 4 continues to be used as an example. After the switch 41 works, power is output to the PoE port 401 (such as sending a detection voltage, powering-on, or supplying power). However, the distributed AP 42 is a powered device, and does not output power to the PoE port 402. Therefore, the central AP 40 probes that the PoE port 401 is connected to power sourcing equipment. The central AP 40 determines, according to a probing result, that the PoE port 401 is a power drawing port (the PoE port 401 is locked as a power drawing port). Further, the central AP 40 connects the PoE port 401 and the PD chip 401-2 (the PoE port 401 is originally in the disconnected state), and locks the PoE port 401 in order to maintain that the PoE port 401 is connected to the PD chip 401-2. Then, the PoE port 401 draws power from connected power sourcing equipment (that is, the switch 41). The PD chip 401-2 draws power from the switch 41 and provides power for the central AP 40. After the central AP 40 obtains power from the switch 41 using the PoE port 401, other components in the central AP 40 can work, such as a processor, a WLAN chip, and the PSE chip 402-1. The PSE chip 402-1 may perform detection on and supply power to the PoE port 402 in order to supply power to the distributed AP 42. In this way, the PoE port 401 and the PoE port 402 adaptively serve as a power drawing port and a power sourcing port respectively according to connected devices. The central AP 40 serves as a PD to draw power from the switch 41, and serves as a PSE to supply power to the distributed AP 42.

Step 503: Determine whether the PoE device 10 has a power supply for supplying power.

Further, when the first PoE port is not connected to power sourcing equipment, whether the PoE device 10 has a power supply for supplying power is determined.

If the PoE device 10 has no power supply for supplying power, whether the first PoE port is connected to power sourcing equipment continues to be probed, that is, step 501 is performed again. When the PoE device 10 has no power supply for supplying power, another component different from the voltage detector in the PoE device 10 cannot work. Therefore, the first voltage detector continuously probes whether the first PoE port is connected to power sourcing equipment.

If the PoE device 10 has a power supply for supplying power, that is, in the foregoing second case in which the PoE device 10 has a power supply for supplying power, step 504 is performed, and the first PoE port is changed to the PSE state. If the PoE device 10 has a power supply for supplying power, all components (the first PSE chip, the first switching switch, the first controller, and the like) in the PoE device 10 can work.

FIG. 4 is still used as an example. If the central AP 40 has no power supply (adapter power supply or PoE) for supplying power, and probes that the PoE ports 401 and 402 are not connected to power sourcing equipment, the central AP 40 performs step 501 again to continue to probe whether the PoE ports 401 and 402 are connected to power sourcing equipment. If the central AP 40 has a power supply for supplying power, the PSE chip 401-1 of the central AP 40 can work. Therefore, the PoE port 401 may be changed to be connected to the PSE chip 401-1 such that the PSE chip 401-1 detects whether the PoE port 401 is connected to a valid PD. Similarly, the PSE chip 402-1 can also work, and the PoE port 402 may be changed to be connected to the PSE chip 402-1 such that the PSE chip 402-1 detects whether the PoE port 402 is connected to a valid PD.

Step 504: Connect the first PoE port and a first PSE chip.

Step 505: Detect whether the first PoE port is connected to a valid PD.

If the PoE device 10 has a power supply for supplying power, the PoE device 10 (the first PSE chip) may detect whether the first PoE port is connected to a valid PD.

If it is detected that the first PoE port is connected to a valid PD, step 506 is performed.

If it is detected that the first PoE port is not connected to a valid PD, step 507 is performed to change the first PoE port to the PD state. If the switching period is set, detection is performed for a plurality of times according to the switching period, and changing is performed after the switching period expires.

Step 506: Lock the first PoE port as a power sourcing port.

After the PoE device 10 detects that the first PoE port is connected to a valid PD, the PoE device 10 locks the first PoE port as a power sourcing port in order to maintain that the first PoE port is connected to the first PSE chip. Further, a lock mark may be set, the first PoE port is locked as a power sourcing port, and the state of the first PoE port is locked. If the switching period is set, timing of the switching period may be further stopped.

Step 507: The PoE device 10 connects the first PoE port to the first PD chip.

After connecting the first PoE port and the first PD chip, the PoE device 10 performs step 501 again.

According to the port adaptation method provided in this embodiment of the present disclosure, when the PoE device 10 is interconnected with another device, the first PoE port may adaptively serve as a power sourcing port or a power drawing port according to the interconnected device without a need to manually distinguish between ports to ensure accuracy of device interconnection.

In the embodiments of the present disclosure, the PoE is used as an example to describe how the PoE port in the PoE device adaptively serves as a power sourcing port or a power drawing port. The present disclosure is also applicable to a scenario in which a similar power supply technology is used, for example, power over data lines (PoDL). In the PoDL scenario, persons skilled in the art may make adaptive modifications, variations, or replacements of different protocols based on the embodiments of the present disclosure, and these shall also fall within the protection scope of the present disclosure.

Persons of ordinary skill in the art may understand that all or a part of the steps of the method embodiments may be implemented by a program instructing relevant hardware. The program may be stored in a computer readable storage medium. The storage medium may include a random access memory, a read-only memory, a flash memory, a hard disk, a solid state disk, or an optical disc.

The foregoing descriptions are merely example implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A port adaptation method, comprising:
receiving, by a network device, a time limit of changing a state of a first port, wherein the state of the first port cannot be changed until the time limit expires, wherein the first port is configured to be in one of three states, wherein a first state comprises a powered state in which the first port is coupled to a power sourcing equipment, wherein a second state comprises a powering state in which the first port is coupled to a powered device, and wherein a third state comprises a disconnected state in which the first port is decoupled from the power sourcing equipment and the powered device;
probing, by the network device, whether the first port of the network device is coupled to the power sourcing equipment or the powered device;
maintaining, by the network device, the state of the first port as the powered state or changing the state of the first port to the powered state when a probing result comprises that the first port is coupled to the power sourcing equipment and that the time limit expires;
changing, by the network device, the state of the first port to the powering state when the probing result comprises that the first port is coupled to the powered device and that the time limit expires; and
changing, by the network device, the state of the first port to the disconnected state when the probing result comprises that the first port is decoupled from the power sourcing equipment and the powered device and that the time limit expires.

2. The port adaptation method of claim 1, wherein after changing the state of the first port to the powering state, the port adaptation method further comprises:
detecting, by the network device, whether the first port is coupled to a valid powered device;
maintaining, by the network device, the powering state of the first port when a detection result is valid; and
changing, by the network device, the state of the first port to the powered state when the detection result is invalid.

3. The port adaptation method of claim 2, wherein changing the state of the first port to the powered state comprises changing, by the network device, the state of the first port to the powered state after the time limit expires when each detection result in the time limit is invalid.

4. The port adaptation method of claim 2, wherein after changing the state of the first port to the powered state, the port adaptation method further comprises probing again, by the network device, whether the first port of the network device is coupled to the power sourcing equipment.

5. The port adaptation method of claim 1, wherein changing the state of the first port to the powering state comprises changing, by the network device, the state of the first port to the powering state after the time limit expires when the network device has a power supply for supplying the power, and wherein each probing result in the time limit comprises that the first port is decoupled from the power sourcing equipment.

6. The port adaptation method of claim 1, further comprising continuing to probe, by the network device, whether the first port is coupled to the power sourcing equipment when the probing result comprises that the first port is decoupled from the power sourcing equipment and the network device has no power supply for supplying power.

7. The port adaptation method of claim 1, further comprising:
stop probing, by the network device, on the first port after the first port is coupled to the power sourcing equipment; and
stop probing, by the network device, on the first port when or after the first port is locked as a power drawing port.

8. The port adaptation method of claim 1, wherein after locking the first port as the power drawing port, the port adaptation method further comprises unlocking, by the network device, the first port to perform probing on the first port again when the network device is abnormal or a device coupled to the first port changes.

9. A port adaptation apparatus, applied to a network device, comprising:
a power sourcing chip;
a powered chip; and
an adaptation circuit, wherein the power sourcing chip and the powered chip are coupled to the adaptation circuit, wherein the adaptation circuit is coupled to a first port of the network device, and wherein the adaptation circuit is configured to:
receive a time limit of changing a state of the first port, wherein the state of the first port cannot be changed until the time limit expires, wherein the first port is configured to be in one of three states, wherein a first state comprises a powered state in which the first port is coupled to a power sourcing equipment, wherein a second state comprises a powering state in which the first port is coupled to a powered device, and wherein a third state comprises a disconnected state in which the first port is decoupled from the power sourcing equipment and the powered device;
probe whether the first port is coupled to the power sourcing equipment or the powered device;
maintain or change the first port to be coupled to the powered chip when a probing result comprises that the first port is coupled to the power sourcing equipment and that the time limit expires;
change the first port to be coupled to the power sourcing chip when the probing result comprises that the first port is coupled to the powered device and that the time limit expires; and
change the first port to be decoupled from the powered chip and the power sourcing chip when the probing result comprises that the first port is decoupled from the power sourcing equipment and the powered device and that the time limit expires.

10. The port adaptation apparatus of claim 9, wherein when the network device has a power supply for supplying power, the power sourcing chip is configured to:
detect whether the first port is coupled to a valid powered device when the power sourcing chip is coupled to the first port; and
feedback a detection result of the first port to the adaptation circuit,
wherein the adaptation circuit is further configured to:
lock the first port as a power sourcing port when the detection result of the first port is valid; and
change the first port to be coupled to the powered chip when the detection result of the first port is invalid, wherein the state of the first port is changed to the powered state.

11. The port adaptation apparatus of claim 9, wherein when the network device has a power supply for supplying power, the adaptation circuit is further configured to:
probe, in the time limit, whether the first port is coupled to the power sourcing equipment; and
change the first port to be coupled to the power sourcing chip after the time limit expires when the probing result comprises that the first port is decoupled from the power sourcing equipment.

12. The port adaptation apparatus of claim 9, wherein the adaptation circuit is further configured to continue to probe whether the first port is coupled to the power sourcing equipment when the probing result comprises that the first port is decoupled from the power sourcing equipment and the network device has no power supply for supplying power.

13. The port adaptation apparatus of claim 9, wherein the adaptation circuit is further configured to:
stop probing on the first port after probing that the first port is coupled to the power sourcing equipment; and
stop probing on the first port when or after locking the first port as a power drawing port.

14. The port adaptation apparatus of claim 9, wherein after locking the first port as a power drawing port, the adaptation circuit is further configured to unlock the first port to perform probing on the first port again when the network device is abnormal or a device coupled to the first port changes.

15. The port adaptation apparatus of claim 9, wherein the adaptation circuit comprises:
a voltage detector coupled to the first port and configured to:
probe whether a valid input voltage exists on the first port in order to probe whether the first port is coupled to the power sourcing equipment; and
feedback a probing result of the first port to a controller;
a switch coupled to the power sourcing chip, the powered chip, and the first port,
wherein the controller is coupled to the voltage detector and the switch and configured to:
send a first instruction to the switch when the probing result comprises that the first port is coupled to the power sourcing equipment and the state of the first port does not comprise the powered state, wherein the first instruction instructs the switch to couple the first port and the powered chip, and wherein the state of the first port is changed to the powered state; and
send a second instruction to the switch when the probing result comprises that the first port is not coupled to the power sourcing equipment and the network device has a power supply for supplying power, wherein the second instruction instructs the switch to couple the first port and the power sourcing chip, and wherein the state of the first port is changed to the powering state.

16. The port adaptation apparatus of claim 15, wherein the power sourcing chip is configured to:
detect whether the first port is coupled to a valid powered device after the state of the first port is changed to the powering state; and
feedback a detection result of the first port to the controller, and
wherein the controller is further configured to:
receive the detection result of the first port from the power sourcing chip;
lock the first port as a power sourcing port when the detection result of the first port is valid; and
send the first instruction to the switch to instruct the switch to couple the first port and the powered chip when the detection result of the first port is invalid, wherein the state of the first port is changed to the powered state.

17. The port adaptation apparatus of claim 15, wherein the switch is further configured to:
receive the first instruction from the controller;
couple the first port and the powered chip according to the first instruction;
receive the second instruction from the controller; and
couple the first port and the power sourcing chip according to the second instruction.

18. The port adaptation apparatus of claim 15, wherein after locking the first port as a power drawing port, the controller is further configured to unlock the first port to perform probing on the first port again when the network device is abnormal or a device coupled to the first port changes.

19. A power supply system, comprising:
a power sourcing equipment;
a powered device; and
an intermediate device, wherein a first port of the intermediate device is coupled to the power sourcing equipment, wherein a second port of the intermediate device is coupled to the powered device, wherein a third port of the intermediate device is decoupled from the power sourcing equipment and the powered device, and wherein the intermediate device comprises:
  a first port adaptation apparatus corresponding to the first port and configured to control the first port to a powered state based on a time limit of changing a state of the first port, wherein the state of the first port cannot be changed until the time limit expires;
  a second port adaptation apparatus corresponding to the second port and configured to control the second port to a powering state based on the time limit of changing a state of the second port, wherein the state of the second port cannot be changed until the time limit expires; and
  a third port adaptation apparatus corresponding to the third port and configured to control the third port to a disconnected state based on the time limit of changing a state of the third port, wherein the state of the third port cannot be changed until the time limit expires.

20. The power supply system of claim 19, wherein the first port adaptation apparatus comprises:
a first power sourcing chip;
a first powered chip; and
a first adaptation circuit coupled to the first power sourcing chip, the first powered chip, and the first port,
wherein the second port adaptation apparatus comprises:
  a second power sourcing chip;
  a second powered chip; and
  a second adaptation circuit coupled to the second power sourcing chip, the second powered chip, and the second port,
wherein the first adaptation circuit is configured to:
  probe whether the first port is coupled to the power sourcing equipment;
  maintain or change the first port to be coupled to the first powered chip when probing that the first port is coupled to the power sourcing equipment; and
  change the first port to be coupled to the first power sourcing chip to change the first port to the powering state when probing that the first port is decoupled from the power sourcing equipment and a network device has a power supply for supplying power, and
wherein the second adaptation circuit is configured to:
  probe whether the second port is coupled to the power sourcing equipment;
  maintain or change the second port to be coupled to the second powered chip when probing that the first port is coupled to the power sourcing equipment; and
  change the first port to be coupled to the second power sourcing chip to change the first port to the powering state when probing that the first port is decoupled from the power sourcing equipment and the network device has the power supply for supplying the power.

* * * * *